(12) United States Patent
Hartmann et al.

(10) Patent No.: US 12,064,867 B2
(45) Date of Patent: Aug. 20, 2024

(54) METHOD AND DEVICE FOR UNLOADING A CONTAINER HAVING PACKAGES

(71) Applicants: Bernd Hartmann, Grafschaft-Leimersdorf (DE); Wolfram Grafe, Elmenhorst (DE)

(72) Inventors: Bernd Hartmann, Grafschaft-Leimersdorf (DE); Wolfram Grafe, Elmenhorst (DE)

(73) Assignee: Deutsche Post AG, Bonn (DE)

( * ) Notice: Subject to any disclaimer, the term of this patent is extended or adjusted under 35 U.S.C. 154(b) by 368 days.

(21) Appl. No.: 17/356,765

(22) Filed: Jun. 24, 2021

(65) Prior Publication Data

US 2021/0402622 A1 Dec. 30, 2021

(30) Foreign Application Priority Data

Jun. 26, 2020 (DE) ...................... 10 2020 116 880.2

(51) Int. Cl.
*B25J 15/12* (2006.01)
*B25J 9/00* (2006.01)
(Continued)

(52) U.S. Cl.
CPC ............ *B25J 15/12* (2013.01); *B25J 9/0093* (2013.01); *B25J 9/1697* (2013.01); *B25J 13/082* (2013.01);
(Continued)

(58) Field of Classification Search
CPC ...... B65G 59/02; B65G 65/02; B65G 65/005; B65G 65/16; B65G 65/32;
(Continued)

(56) References Cited

U.S. PATENT DOCUMENTS 6,652,014 B2 * 11/2003 Schmalz .............. B25J 15/0616
414/737
8,651,794 B2 2/2014 Pippin
(Continued)

FOREIGN PATENT DOCUMENTS

CN 105143075 A 12/2015
CN 105473474 A 4/2016
(Continued)

OTHER PUBLICATIONS

US 2022/0135346 A1, Matsuoka et al., May 5, 2022.*

*Primary Examiner* — Douglas A Hess
(74) *Attorney, Agent, or Firm* — Reinhart Boerner Van Deuren P.C.

(57) ABSTRACT

A method for unloading a container having packages with a rail device comprising a rail having a hand element displaceable in the longitudinal direction. The hand element has a plurality of finger elements having two flexible flank elements extending jointly from one end to the opposite end of the finger element. Each are connected flexibly to each other via a plurality of webs. The finger elements adjustable from a curved position into an extended position and back. The packages are stacked in the container forming a front face in which the rail device is brought close to the front face of the stacked packages. One hand element grips one package from the stack of packages and removes it from the stack. Following the removal, it is displaced along the rail and following the displacement grips one further package and removes it from the stack of packages.

32 Claims, 10 Drawing Sheets

(51) Int. Cl.
*B25J 9/16* (2006.01)
*B25J 13/08* (2006.01)
*B25J 15/10* (2006.01)
*B65G 59/02* (2006.01)
*B65G 65/00* (2006.01)
*B65G 65/02* (2006.01)
*B65G 65/16* (2006.01)
*B65G 65/32* (2006.01)

(52) U.S. Cl.
CPC .............. *B25J 15/10* (2013.01); *B65G 59/02* (2013.01); *B65G 65/005* (2013.01); *B65G 65/02* (2013.01); *B65G 2201/025* (2013.01); *B65G 2203/0233* (2013.01); *B65G 2203/041* (2013.01); *B65G 2814/031* (2013.01)

(58) Field of Classification Search
CPC ...... B65G 2201/025; B65G 2203/0233; B65G 2203/041; B65G 2814/031; B25J 15/10; B25J 15/12; B25J 9/0093; B25J 9/1697; B25J 13/082
USPC .......................................... 198/512; 414/285
See application file for complete search history.

(56) References Cited

U.S. PATENT DOCUMENTS

| | | | | |
|---|---|---|---|---|
| 9,725,257 | B2* | 8/2017 | Schenning | B65G 67/08 |
| 9,969,573 | B2* | 5/2018 | Girtman | B25J 11/00 |
| 10,226,865 | B2* | 3/2019 | Nakayama | B25J 9/1669 |
| 10,906,186 | B2* | 2/2021 | Takahashi | B25J 15/0616 |
| 11,027,921 | B2* | 6/2021 | Cole | B25J 15/0047 |
| 11,613,436 | B2* | 3/2023 | Hartmann | B65G 47/90 198/512 |
| 2010/0263500 | A1 | 10/2010 | Bannasch et al. | |
| 2014/0341694 | A1 | 11/2014 | Girtman et al. | |
| 2017/0096301 | A1 | 4/2017 | Hartmann et al. | |
| 2018/0072517 | A1 | 3/2018 | Girtman et al. | |
| 2018/0346264 | A9 | 12/2018 | Girtman et al. | |

FOREIGN PATENT DOCUMENTS

| | | |
|---|---|---|
| CN | 106882599 A | 6/2017 |
| CN | 107117470 A | 9/2017 |
| CN | 110382382 A | 10/2019 |
| CN | 114291589 A | 4/2022 |
| DE | 10 2015 116 720 A1 | 4/2017 |
| EP | 2241403 A1 | 10/2010 |
| EP | 3 725 713 A1 | 10/2020 |

* cited by examiner

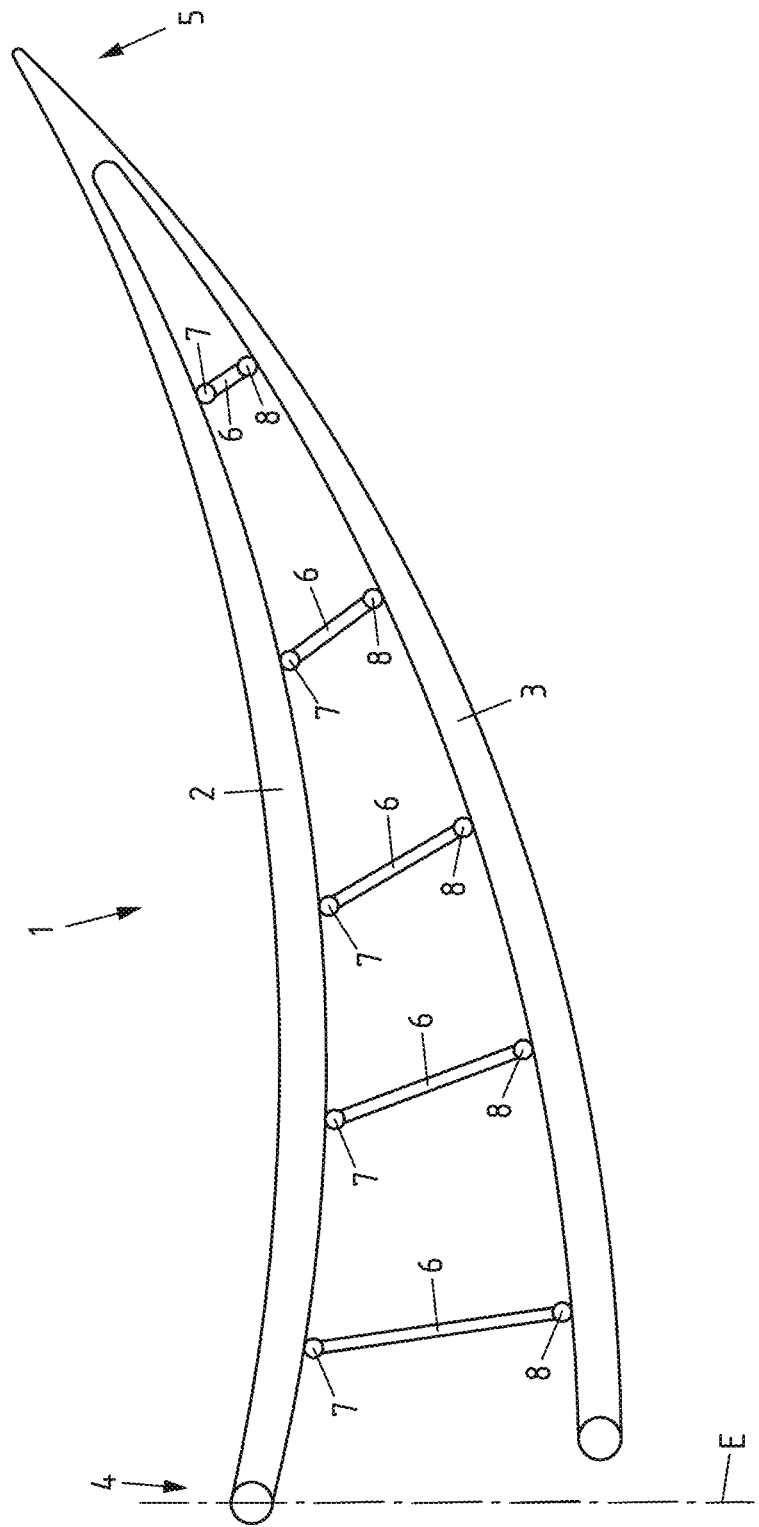

METHOD AND DEVICE FOR UNLOADING A CONTAINER HAVING PACKAGES

CROSS-REFERENCE TO RELATED PATENT APPLICATIONS

This patent application claims the benefit of priority to German Patent Application No. 10 2020 116 880.2, filed Jun. 26, 2020, the entire teaching and disclosure of which is incorporated herein by reference thereto.

FIELD OF THE INVENTION

The invention relates to a method and a device for unloading a container having packages, in particular a box body, interchangeable container or roller container.

BACKGROUND OF THE INVENTION

Different methods for unloading containers which are loaded with packages are already known. These containers can be bodies of commercial vehicles which, for example, are designated as box bodies. So-called interchangeable containers are understood as bodies of commercial vehicles which are either carried by a chassis of a commercial vehicle or stand on legs on the ground. In the last-named case, the chassis of the commercial vehicle can be moved under the interchangeable container and the interchangeable container can be left back in place. Commercial vehicles are understood in particular to be those vehicles which are provided for the transport of packages via public road traffic. In addition, containers which are predominantly used in works premises, in halls and the like are also considered. Such containers can be provided permanently with rollers and are therefore also often designated as roller containers. Roller containers are, for example, loaded with packages and then themselves loaded into commercial vehicle bodies.

In the containers, the packages are as a rule more or less stacked, in order that the volume of the container can be utilized better. Nevertheless, the stacks can often be quite irregular in order that the loading of the containers does not take up too much time. Added to this is the fact that the packages can often not have uniform but very different dimensions, which permits the packages to be stacked only with restrictions. Although the packages can often have quite different dimensions, the containers are loaded as far as possible until under the roof of the container, if the latter has a roof, in order to utilize the volume available.

If the packages have to be unloaded from very many containers in a short time, for example because these packages have to be sorted and distributed further in a short time, effective and efficient unloading of the packages from the containers is desirable. To this end, different methods have already been proposed, which make use of different aids such as telescopic belt conveyors. In most cases, the unloading of the packages from the containers is carried out by people, however, who remove the packages and then lay them on a conveyor belt, for example a telescopic belt conveyor, which transports the packages to further processing, sorting and/or redistribution. However, all these methods are quite complicated and not yet satisfactory with regard to costs.

BRIEF SUMMARY OF THE INVENTION

The present invention is therefore based on the object of configuring and developing the method mentioned at the beginning and previously more closely described in such a way that the unloading can be carried out more effectively and more efficiently.

According to claim 1, this object is achieved by a method for unloading a container having packages, in particular a box body, interchangeable container or roller container, with a rail device comprising at least one rail, wherein a hand element displaceable in the longitudinal direction of the rail is provided on the at least one rail, wherein the hand element has a plurality of finger elements, wherein the finger elements each have at least two flexible flank elements extending jointly from one end of the finger element to the opposite end of the finger element, wherein in each case the at least two flexible flank elements of the finger elements are each connected flexibly to each other via a plurality of webs, so that the finger elements can each be adjusted from at least a curved position into at least an extended position and back, wherein the packages are stacked in the container, wherein the stacked packages form a front face, in which the rail device is brought close to the front face of the stacked packages, in which the at least one hand element grips at least one package from the stack of packages and removes it from the stack of packages, in which, following the removal of the at least one package from the stack of packages, the at least one hand element is displaced along the at least one rail, and in which, following the displacement along the at least one rail element, the at least one hand element grips at least one further package from the stack of packages and removes it from the stack of packages.

The aforementioned object is further achieved, according to claim 16, by a device for unloading a container having packages, in particular a box body, interchangeable container or roller container, according to a method of claims 1 to 15, having a rail device comprising at least one rail, wherein at least one hand element displaceable in the longitudinal direction of the rail is provided on the at least one rail, wherein the hand element has a plurality of finger elements, wherein the finger elements each have at least two flexible flank elements extending jointly from one end of the finger element to the opposite end of the finger element, wherein in each case the at least two flexible flank elements of the finger elements are each connected flexibly to each other via a plurality of webs, so that the finger elements can each be adjusted from at least a curved position into at least an extended position and back.

According to the invention, the packages are unloaded from the container with a hand element which comprises a series of finger elements and can thus make the manual unloading of the packages by a person dispensable. Furthermore, the invention makes use of the so-called fin ray effect in order, if necessary, to be able to unload packages having very different dimensions in a targeted manner and without damage.

The finger elements of the hand element each have at least two flexible flank elements extending jointly from one end of the finger element to the opposite finger element. Here, it is recommended for the flank elements to form the upper side and the underside of each finger element, so that the packages are always gripped by a flank element. However, this is not absolutely necessary. The flexible flank elements of each finger element are however each connected flexibly to each other via a plurality of webs, so that the finger elements are given the necessary flexibility in order to be able to be displaced from at least a curved position into at least an extended position and back. Here, it is particularly expedient if the finger elements can be curved and extended again steplessly. Then, the finger elements can assume differently curved positions, specifically in each case precisely in a manner that is suitable for gripping and unloading a specific package.

Since the packages in the container to be unloaded are stacked more or less uniformly, the packages in the container form a front face of packages stacked on one another. The hand element is therefore displaceably held on a rail of a rail device, wherein the rail device can be brought close to the front face of the stack of packages to unload the packages. Then, by using the at least one hand element, at least one package or a plurality of packages can be gripped and brought down simultaneously from the stack of packages, consequently removed from the stack of packages. In order that at least one further package can be removed from the remaining stack of packages in a further step, the hand element is then displaced along the at least one rail, specifically such that at the new position the hand element can grip the at least one further package from the stack of packages and remove it from the stack. Thus, the packages can also be removed from wide front faces of stacked packages. In other words, it is thus possible also to unload the packages from wide containers.

If the container or the stack of packages has an appropriate depth, the at least one hand element can be brought step by step to the remaining front face of the stack of packages via the rail device until all the packages have been unloaded from the container. It is advisable to unload the corresponding container slice by slice, the individual slices being at least substantially vertical slices of the stack of packages in the container.

Here, a stack is understood to be a multiplicity of packages arranged at least irregularly on one another and beside one another. However, this is not a heap, in which the packages have been thrown randomly on one another and form the shape of a cone. If necessary, to some extent the stack of packages can, however, also have heap-like sections.

The so-called fin ray effect can be observed in the tailfins of bony fish. If a finger is pressed laterally against them, the fins do not curve away but bend against the finger. This is possible as a result of a specific construction of the fins. The latter is imitated appropriately in the finger elements of the at least one hand element.

The necessary flexibility of the finger elements can be provided, for example, by elastic flank elements or by a linked chain of rigid chain elements connected to one another in a pivotable or articulated manner. Corresponding flexibility is required only in one spatial direction. In the spatial directions perpendicular thereto, flexibility is not absolutely necessary. Nevertheless, flexibility in two mutually perpendicular spatial directions would also be conceivable and also preferred if necessary. The corresponding flexibility of the flank elements ultimately permits a curvature of the finger element, starting from an extended position, into a curved position, for example similar to the curvature of a finger.

In order that the curvature of the finger element in one direction can be triggered, for example, by a pressure against the finger element, in particular against a flank element, in the opposite direction, the at least two flank elements between the two ends of the finger element are each connected flexibly to one another via a plurality of webs. The webs can be formed rigidly and connected to the flank elements in a pivotable or articulated manner. However, if necessary as an alternative to pivotable or articulated connections to the at least two flank elements, flexible, in particular elastic, webs can also be used. In this way, the webs can pivot relative to the at least two flank elements, in order thus to permit a curvature of the finger element from an extended position into a curved position and back.

An extended position of the finger element can be understood to be a maximum extended and/or elongated alignment of the finger element. However, it can also be a position from which the finger element can be adjusted by a further curvature into a position curved further with respect to the extended position. Accordingly, the curved position does not also have to be a maximum curved position. The terms extended position and curved position can therefore be understood if necessary as merely relative, that is to say as positions relative to one another. Furthermore, it is necessary to take account of the fact that the finger elements can be adjusted in the opposite direction from an extended position into differently curved positions.

Because of the appropriate construction, the finger element ultimately permits adaptation of the shape to the shape of the parcels to be transported if the finger elements press against the parcel or vice versa. Therefore, firstly, a larger contact surface of the finger element and parcel can be provided, which improves the handling of the parcel. In addition, the surface pressure between finger element and parcel can be reduced, which benefits damage-free parcel handling.

However, if necessary the structure of the finger element also permits a prior curvature to be set, without there being any contact between the finger element and the at least one parcel. To this end, for example, the flank elements can be adjusted relative to one another in the longitudinal direction of the finger element. In the process, the finger element then curves away from the flank element which, with respect to the at least one further flank element, is adjusted further in the longitudinal direction toward the opposite end of the finger element.

In order, for example, to be able to adjust the finger element not only in one plane, the finger element can, for example, also have three or more flank elements, which are connected to one another via webs. The webs can be, for example, cross-shaped, star-shaped, rectangular, square, oval or round, in order to be able to be fixed simply to all the flank elements. The corresponding connections are preferably either pivotable or rotatable and/or the webs are flexible.

As a result of the fact that a plurality of finger elements can be combined to form at least one hand element, the unloading is possible more efficiently and more effectively than with individual fingers. This is because the packages can be gripped much better and more carefully in order to bring the packages down from the stack of packages. The hand element can be pressed against the package to be removed, the finger elements then being placed partly around the adjacent package as a result of the fin ray effect, so that these packages can be gripped by the finger elements of the hand element. Then, by means of a simple movement of the hand element, the at least one gripped package can be removed from the stack of packages. Alternatively or additionally, at least one finger element of the at least one hand element can be curved before the finger element comes into contact with the package to be gripped. The corresponding curvature is effected by an appropriate adjustment of the flank elements of the finger element in their longitudinal direction, which necessarily leads to an increasing or a decreasing curvature of the finger element, depending on the direction in which the flank elements of the finger element are adjusted relative to one another. The finger elements can then be curved further as a result of the contact with the packages to be removed, or the packages to be removed can be gripped by the previously curved finger without any further curvature and removed from the stack of packages.

Packages is understood if necessary to be a particular type of parcels. Packages can then be goods packed with packaging materials. Packages can consequently have at least one outer packaging material made of paper, paperboard, fabric or plastic and be present, for example, as packets, boxes and containers and as non-dimensionally stable bundles such as bags or sacks.

For improved comprehensibility and to avoid unnecessary repetitions, in the following the method and the device for carrying out the method will be described jointly without in each case distinguishing in detail between the method and the device. Nevertheless, however, by using the context, those skilled in the art will gather which feature is respectively particularly preferred with regard to the method and the device.

In a first particularly preferred refinement of the method, the at least one hand element is pressed against the stack of packages in a gripping direction such that at least one flank element of at least one finger element is partially pressed in. Partially pressing in the flank element has the effect of adjusting the corresponding finger element from a more extended into a more curved position. In this way, the finger elements permit reliable and simultaneously careful gripping of the packages. The packages can thus be expediently removed from the stack of packages without permanently damaging the packages in the process.

In order to be able to adjust the at least one finger element of the at least one hand element in a targeted manner, it is alternatively or additionally advisable for the at least one hand element and/or at least one finger element to be driven via a drive unit for adjusting the at least two flank elements relative to each other in a longitudinal direction of the finger element. Then, at least the flank elements of at least one finger element are adjusted such that the corresponding finger elements can be adjusted specifically from a more curved into a more extended position and/or back. The adjustment is then preferably carried out in such a way that expedient gripping and removal of packages from the stack of packages can be expected.

In order to avoid the packages nevertheless being damaged by the finger elements, it may be advisable to provide the at least one hand element and/or at least one finger element with at least one pressure sensor. Then, the pressure produced during the gripping and removal of packages from the stack of packages and exerted on the at least one hand element or the at least one finger element can be detected and, for example, the production of higher forces can be prevented if a predefined pressure is reached or exceeded. In this connection, it is advisable in particular for the at least one pressure sensor to be assigned to at least one flank element in order to detect the pressure exerted on the flank element.

In order to be able to transport the packages removed from the stack away quickly and reliably, it may be expedient if the packages removed from the stack of packages are moved directly or at least indirectly onto a belt conveyor device, in particular comprising a telescopic belt conveyor. The appropriate belt conveyor can then transport the packages to a further processing, sorting or onward distribution location, specifically more or less individually. This simplifies the subsequent handling of the packages. It may be particularly careful and reliable if the packages removed from the stack of packages are moved downward onto the belt conveyor device arranged underneath the at least one hand element. This does not require any complicated additional handling of the packages and, likewise, ensures that the packages removed from the stack of packages are also reliably transported away. Furthermore, preferably at least one belt conveyor device can be used which, if necessary, can extend at least substantially over the entire width of the container in order to permit particularly effective unloading of the container. On the other hand, if the unloading were to be carried out by a person, the at least one belt conveyor device could not extend over the entire width of the container, since the person must move along the floor of the container for the unloading.

In order to be able to control the at least one hand element in such a way that the corresponding container can be unloaded quickly and yet reliably, it is advisable if the position of the stack of packages, the contour of the stack of packages and/or the contour of the front face of the stack of packages is at least partly detected by a sensor. Thus, the sensor can give an impression of how the respective stack of packages to be unloaded is constituted, in particular at the respective point in time. The hand element can then be moved such that the stack is unloaded from top to bottom in a manner that handles the packages carefully. For simplicity and reliability, it is advisable for the at least one sensor to be an optical sensor, such as a camera. Irrespective of the type of sensor, however, the movement of the hand element can if necessary be at least partly controlled on the basis of the position and/or contour of the stack detected by the sensor.

In order that the containers can also be unloaded expediently when they contain high stacks of packages, provision can be made for the at least one hand element and/or the at least one rail to be adjusted upward or downward, depending on the height of the stack of packages, on the position of the stack of packages, on the contour of the stack of packages and/or on the contour of the front face of the stack of packages. Here, for example the rail can initially be adjusted so far up that the stack of packages can be unloaded beginning from the top. Then, the at least one rail can respectively be adjusted so far down that the stack of packages which has become lower can be unloaded further. If the stack has a certain depth, this can be carried out repeatedly. In the process, the rail device will always be brought closer step by step to the front face of the stack of packages.

In order to increase the effectiveness of the unloading of the packages, it may be advisable if the at least one hand element is displaced along the at least one rail, depending on the position of the stack of packages, on the contour of the stack of packages and/or on the contour of the front face of the stack of packages. Then, the hand element can always be displaced to where the next packages are to be unloaded, in order to be able to empty the container as quickly as possible overall.

A type of unloading that is particularly expedient and careful for the packages can be provided if at least an upper hand element removes at least one package from the stack of packages one after another, and the at least one package thus removed is moved into at least one further lower hand element arranged underneath the at least one upper hand element. The lower hand element can consequently accept or catch the at least one package from the upper hand element. In order that a high throughput of the unloaded packages can be provided, it is advisable if the at least one further, lower hand element at least partly catches the respective at least one package from the at least one upper hand element and leads it onward in an at least partly braked manner. Thus, a smooth and nevertheless a careful package flow can be maintained during the unloading of the container.

This applies to a particular extent if the packages picked up one after another by the at least one lower hand element are forwarded one after another individually. This can expediently be achieved with the at least one lower hand element such that the finger elements of the at least one further lower hand element are moved relative to one another in a suitable way. This movement can simulate the movement of the finger of the human hand, which holds several objects and allows them to slide one after another through the fingers.

If the at least one further lower hand element is adjusted to the side and/or vertically, depending on the position of the at least one other upper hand element, it is possible to ensure that the lower hand element reliably catches the packages from the upper hand element. This is in particular or particularly simply the case if the at least one further lower hand element is adjusted to the side and/or vertically together with the at least one other upper hand element. To further simplify this adjustment, it may be expedient if the at least one upper hand element and the at least one lower hand element are adjusted jointly while maintaining an at least substantially constant distance from each other.

The at least one further lower hand element can in principle be displaced entirely on the at least one rail of the upper hand element. This permits a simpler configuration of the rail device. More flexible adjustment of the hand elements and corresponding adaptation of the positions of the hand elements over the height of the stack of packages in the container to be unloaded can, however, in principle be achieved if the at least one lower hand element is displaced on at least a further lower rail in the longitudinal direction of the respective rail. Alternatively or additionally, the at least one further lower rail can also be used to adjust the at least one lower hand element upward or downward. The latter can be brought about simply and expediently if the at least one further lower rail is adjusted upward and/or downward for this purpose.

Alternatively or additionally, it is advisable if the at least one further lower hand element and/or the at least one further lower rail is adjusted vertically, depending on the height of the stack of packages, on the position of the stack of packages, on the contour of the stack of packages, on the contour of the front face of the stack of packages and/or on the position of the at least one upper hand element. In this way, more efficient and more effective unloading of the container can be achieved.

The at least one further hand element can alternatively or additionally also be displaced along the at least one in particular further lower rail, depending on the position of the stack of packages, on the contour of the stack of packages, on the contour of the front face of the stack of packages and/or on the position of the at least one upper hand element. More efficient and more effective unloading of the container can also thus be achieved.

The corresponding method can readily be applied to the unloading of stacks of packages having very different depths if the at least one rail device, in particular with the at least one further lower rail, the at least one rail and/or the at least one further lower rail is moved into the container. This is particularly expedient if the rail device and/or the at least one corresponding rail is moved into the container step by step. The stack of packages can then expediently be unloaded slice by slice.

BRIEF DESCRIPTION OF THE DRAWINGS

In the following, the invention will be explained in more detail by using a drawing, illustrating only an exemplary embodiment. In the drawing:

FIGS. 2A-C show a functional principle of the finger element from FIG. 1 during the adjustment of flank elements relative to one another.

DETAILED DESCRIPTION OF THE INVENTION

Figure 1:
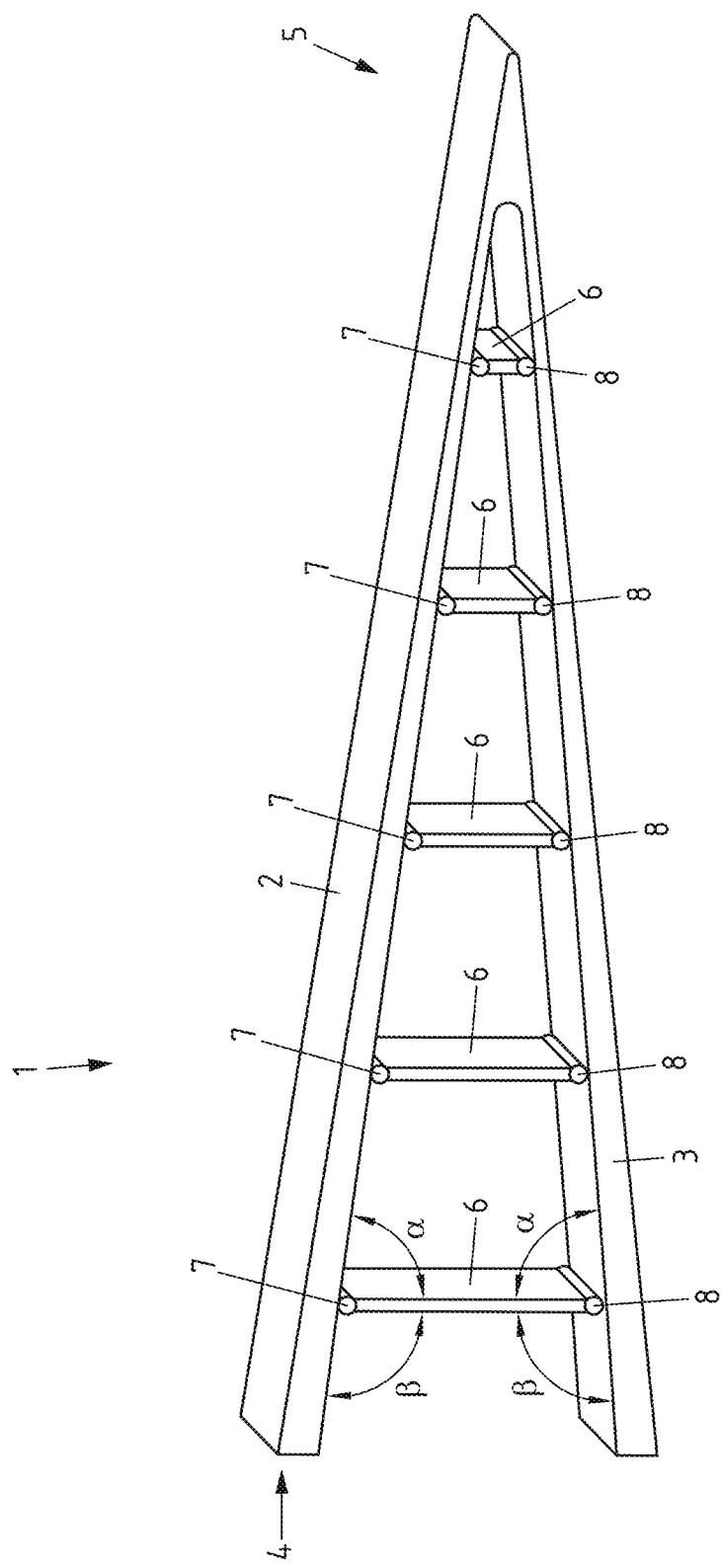
FIG. 1 shows a finger element of a belt conveyor device according to the invention and/or for carrying out the method according to the invention in side view.

FIG. 1 illustrates a finger element 1 which permits auto-adaptive deformation. The finger element 1 has two flank elements 2, 3 which, in the finger element 1 that is illustrated and to this extent preferred, extends jointly from one end 4 of the finger element 1 to the opposite end 5 of the finger element 1. In addition, the flank elements 2, 3 approach each other continuously in a longitudinal direction of the finger element 1. While the flank elements 2, 3 are spaced apart from each other at one end 4 of the finger element 1, the flank elements 2, 3 are connected directly to each other at the other end 5 of the finger element 1. Therefore, a finger element 1 that narrows in one direction and tapers conically is obtained.

Between the flank elements 2, 3, webs 6 that are distributed over the length of the finger element 1 are provided, via which the flank elements 2, 3 are connected to each other. In the finger element 1 that is illustrated and to this extent preferred, the webs 6 are connected to the flank elements 2, 3 in an articulated manner via joints at both opposite ends 7, 8. Alternatively, the webs 6 could be flexible. The webs 6 in the finger element 1 that is illustrated and to this extent preferred are distributed uniformly at intervals over the length of the finger element 1. However, this is not absolutely necessary. In addition, it is not absolutely necessary that the webs 6 extend parallel to each other as in the illustrated finger element 1. However, it is preferred that the webs 6 form with each of the flank elements 2, 3 an acute angle $\alpha$ on one side and an obtuse angle $\beta$ on the opposite side.

Figure 2A:
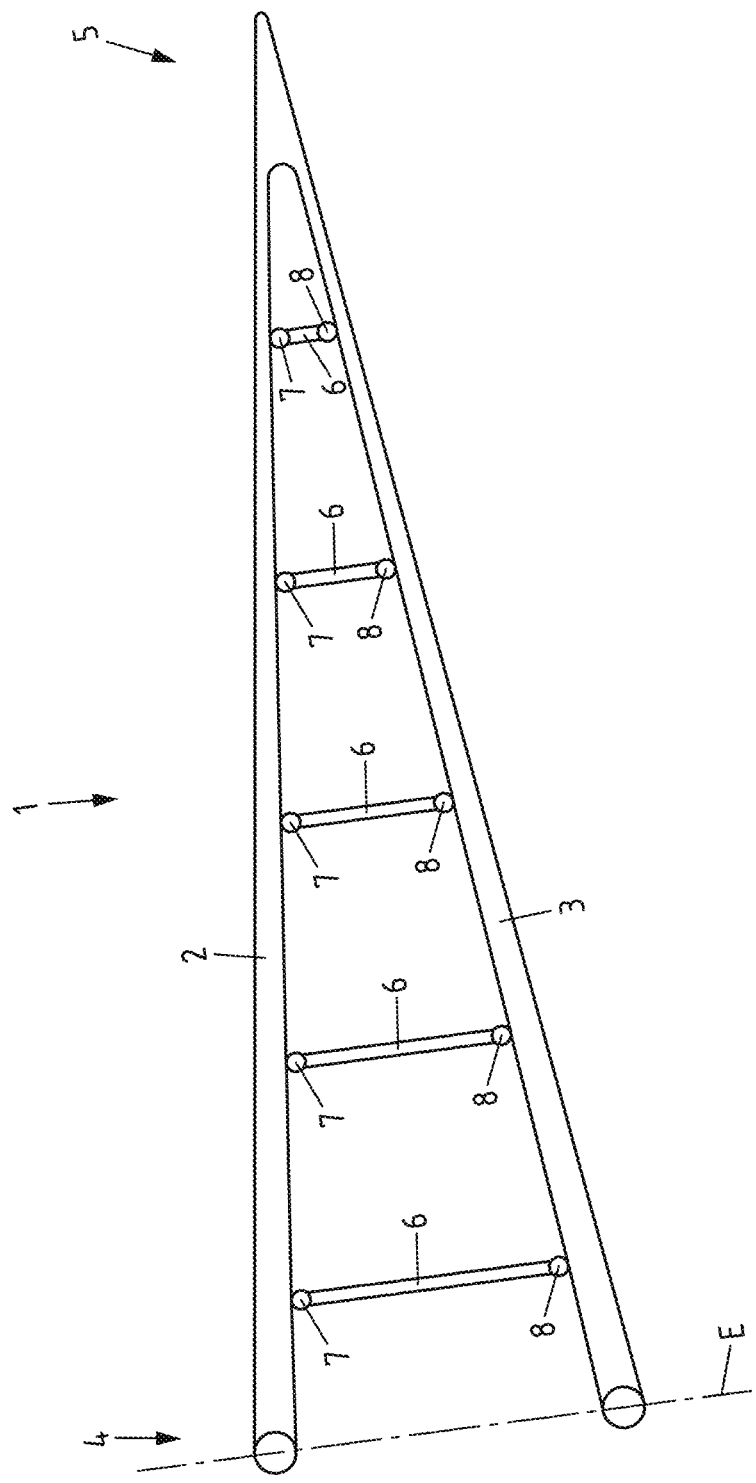
Figure 2B:
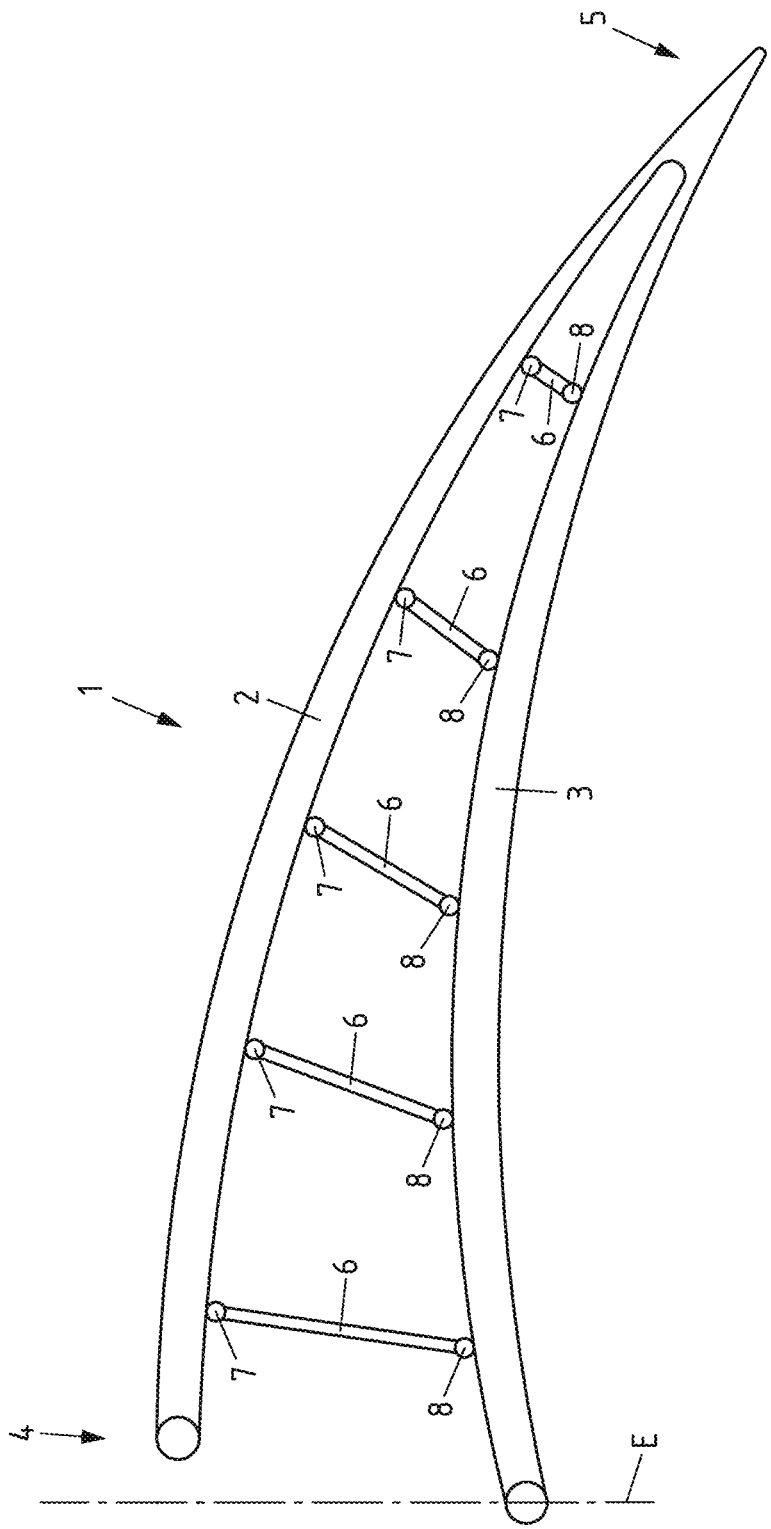

The flank elements 2, 3 that are illustrated and to this extent preferred are flexible, so that the flank elements 2, 3 can be bent about an axis perpendicular to the longitudinal extent of the finger element 1, which is illustrated in particular in FIGS. 2A-C. For this purpose, it is expedient if the flank elements 2, 3 are formed from a flexible plastic or, for example, rubber. The webs 6 could likewise be formed from plastic or, for example, from a metal, since the webs 6 do not have to have any flexibility. In FIG. 2A, the finger element 1 from FIG., 1 is illustrated in an initial position, in which the finger element 1 is present in an extended alignment, wherein the free ends of the flank elements 2, 3 are arranged in a plane E. In the finger element 1 that is illustrated and to this extent preferred, the flank elements 2, 3 are formed at least substantially symmetrically to each other in this position.

If, then, according to FIG. 2B, as compared with the initial position, the free end of the upper flank element 2 is displaced forward out of the illustrated plane E in the longitudinal direction of the finger element 1, the finger element 1 curves downward because of the connection of the flank elements 2, 3 via the plurality of webs 6. In this way, the end 5 of the finger element 1 that is illustrated on the right is adjusted downward. In an analogous way, the finger unit 1 curves upward according to FIG. 2C, wherein the corresponding end 5 of the finger element 1 is adjusted upward when the free end of the lower flank element 3 is displaced forward in the direction of the curving tip of the finger element 1, out of the plane E in the longitudinal direction of the finger element 1. It can also be gathered from FIGS. 2A-C that the webs 6 between the flank elements 2, 3 are inclined in different directions during the curvature of the finger element 1.

In order to bring about the displacement of the flank elements 2, 3 analogously to FIGS. 2A-C, a drive unit, not illustrated, can be provided. Suitable drive units are known from the prior art. Suitable drive units can, for example, have at least one linear drive. Thus, at least one flank element 2, 3 can be adjusted forward and back without difficulty in the longitudinal direction of the finger element 1.

Not illustrated is the fact that more than two, for example at least three or four, flank elements can be provided. For simplicity, these are then arranged to be distributed, in particular uniformly, about a longitudinal axis of the finger element. The multiple flank elements can then run together in a common tip of the finger element, in particular with free ends. In addition or alternatively, the webs can preferably each connect all the flank elements to one another. The flank elements 2, 3 that are illustrated and to this extent preferred are strip-like. However, a plate-like or rod-like configuration of the flank elements would also be possible.

Figure 3:
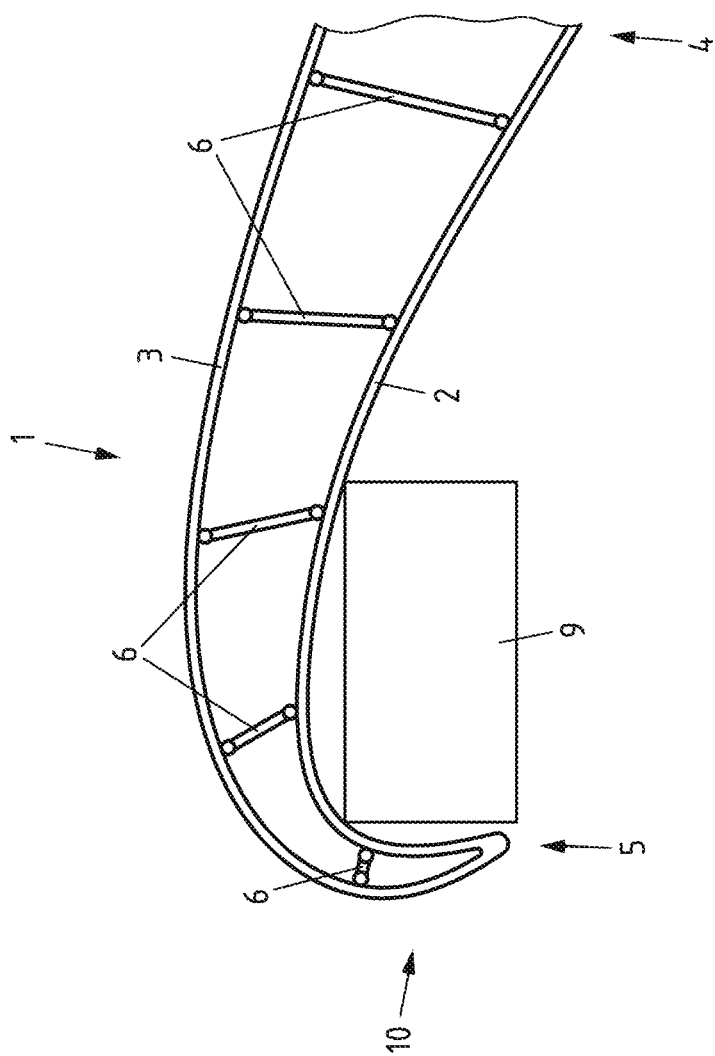
FIG. 3 shows a functional principle of the finger element from FIG. 1 during the auto-adaptive adjustment of a flank.

The finger element 1 described can, however, be adjusted differently than as shown in FIGS. 2A-C, to be specific, according to FIG. 3, which shows an auto-adaptive adjustment of a flank element 2, 3 of the finger element 1, while a flank element 2 presses against a package 9 and is curved in the process. The corresponding flank element 2 is displaced locally inward relative to the finger element 1 in the direction of the pressing force F, which, because of the coupling of the flank elements 2, 3 via the webs 6, leads to the flank element 2 at another point, specifically in the direction of the two ends 10 of the flank elements 1 that are connected to each other, being curved in the direction of the package 9 at the end 5 of the finger unit 5, illustrated on the left. As a result, the package 9 is partly embraced by the finger element 1.

Figure 4:
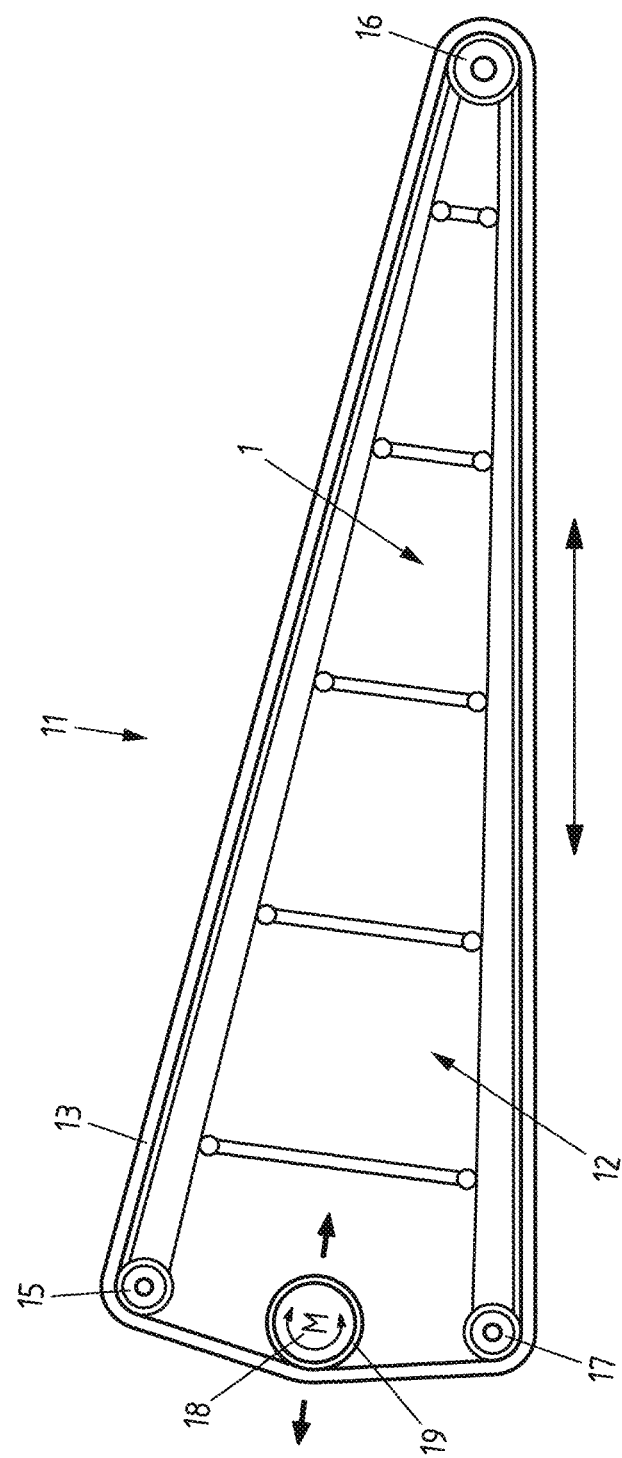
FIG. 4 shows a belt conveyor device according to the invention in a schematic side view.

In FIG. 4, a belt conveyor device 11 is illustrated, in which the supporting structure 12 of the belt conveyor device 11 comprises a finger element 1 according to FIG. 1. The conveyor belt 13 of the belt conveyor device 11 runs around the supporting structure 12 and then around the finger element 1. To this end, the belt conveyor device 11 that is illustrated and to this extent preferred has multiple deflections in the form of deflection rollers 15, 16, 17. One deflection roller 15 is provided at the interconnected ends 10 of the flank elements 2, 3, wherein the deflection roller 15 is ultimately carried and supported by the corresponding end 5 of the finger element 1. Furthermore, in each case a deflection in the form of a deflection roller 16, 17 is provided at the free ends of the flank elements 2, 3. Also provided is a drive 18 which, in the belt conveyor device 13 that is illustrated and to this extent preferred, can drive the conveyor belt 13 in different directions. The drive 18 is provided via a drive roller 19 which, if necessary, can be adjusted, for example in the longitudinal direction of the finger element 1, to tension the conveyor belt 13. In addition, for a slip-free drive of the conveyor belt 13, toothing which meshes with toothing on the drive roller 19 can be provided on the conveyor belt 13. Differing from the belt conveyor device 11 that is illustrated and to this extent preferred, the supporting structure 12 around which the conveyor belt 13 circulates can have still further supporting structural parts besides the finger element 1.

In the belt conveyor device 11 that is illustrated and to this extent preferred, the conveyor belt 13 is guided along the flank elements 2, 3, specifically so close that the conveyor belt 13 can if necessary be pressed against a flank element 2, 3 by a package 9. The finger element 1 can be adjusted auto-adaptively or proactively in relation to the corresponding package 9, as has already been described. In the finger element 1 of the belt conveyor device 11 illustrated in FIG. 4, the flank elements 2, 3 can therefore also be displaced toward each other in the longitudinal direction of the finger element 1 in order to curve the finger element 1. With the adjustment of one end 5 of the finger element 1 in a direction perpendicular to the longitudinal extent of the finger element 1, which is associated therewith as a result, the conveyor belt 13 and the course of the latter around the finger element 1 is also adjusted. If the conveyor belt 13 is also to be guided along on the flank elements 2, 3 at a short distance from the latter with a curved finger element 1, if necessary further devices, not illustrated, for positioning the conveyor belt 13 must be provided between the deflection rollers 15, 16, 17, adjacent to the flank elements 2, 3 or at least one flank element 2, 3.

Figure 5:
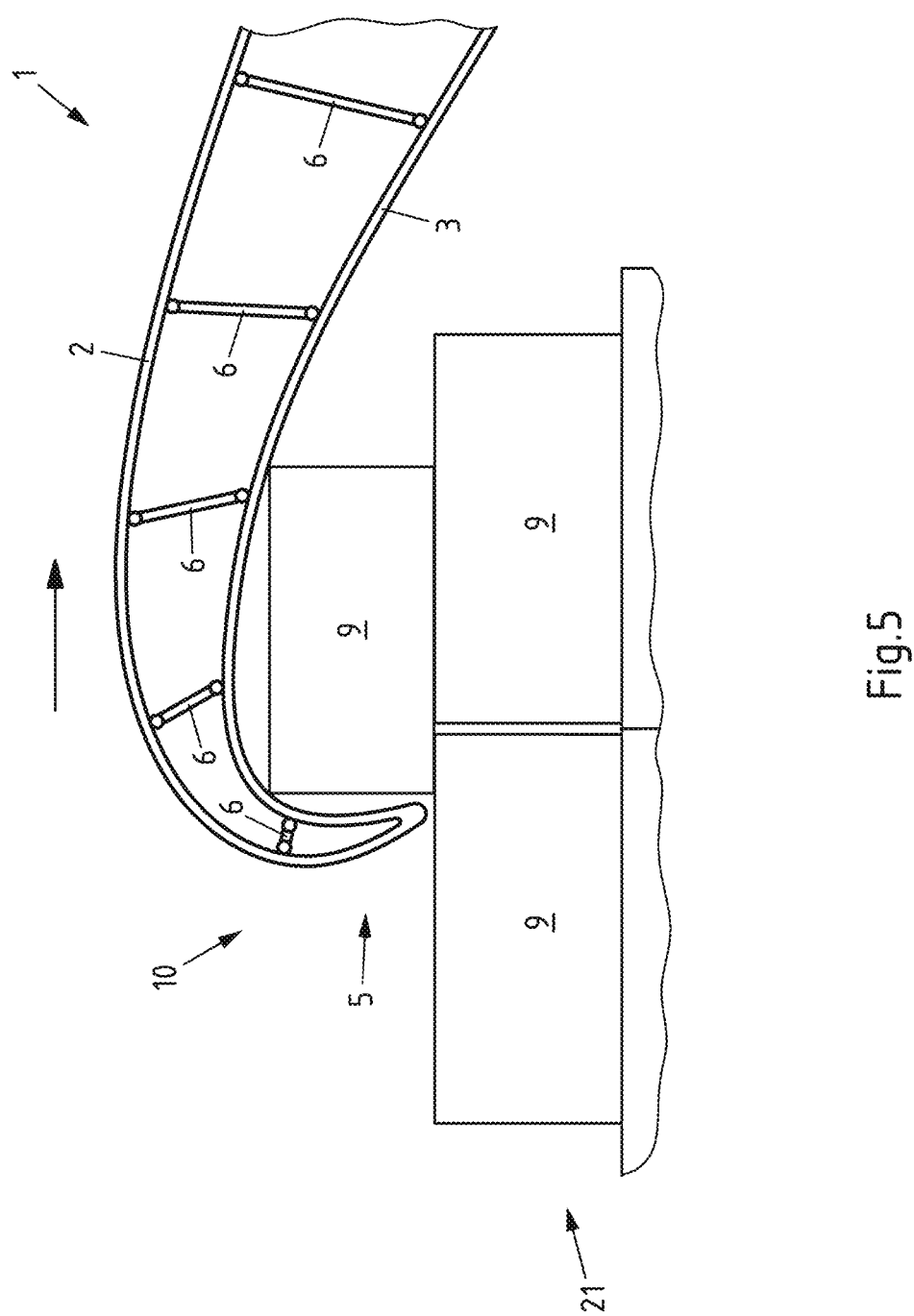
FIG. 5 shows the auto-adaptive adaptation of the finger element to a parcel according to a method according to the invention in a schematic side view.

In FIG. 5, the use of a finger element 1 as part of an upper hand element 20 for removing packages 9 lying on a stack 21 of packages 9 is illustrated schematically. At least one package 9 is gripped by at least one finger element 22 of an upper hand element 20 and, by adjusting the finger elements 22 of the upper hand element 20 and/or by adjusting the upper hand element 20 itself, is removed from the stack 21 of packages 9, specifically in the direction of the arrow illustrated. The curvature of the at least one finger element 22 of the upper hand element 20 can be brought about by a pressure of the finger element 22 against the package 9 or by adjusting the flank elements 2, 3 toward each other.

Figure 6:
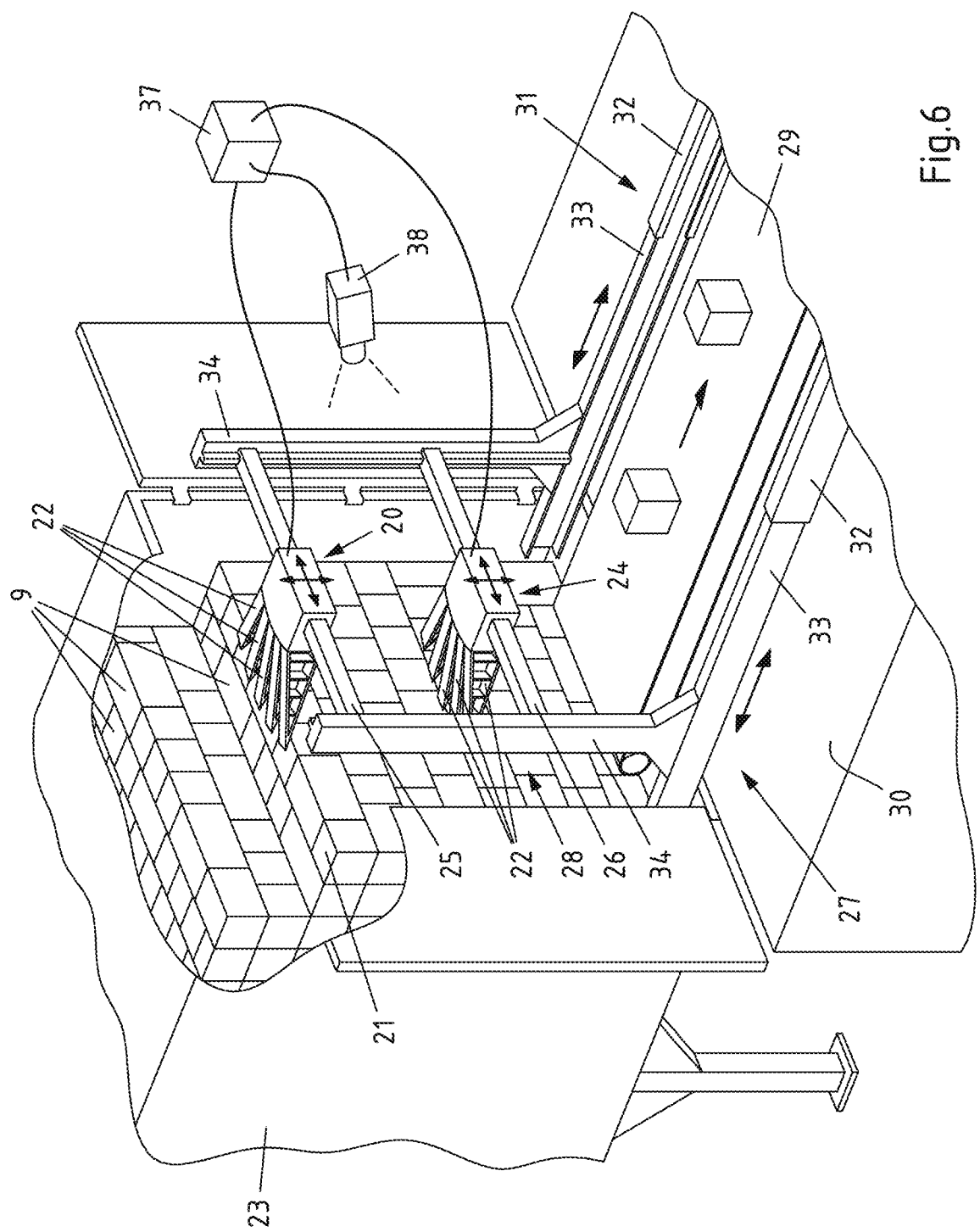
FIG. 6 shows the method and the device for unloading packages from a container in a perspective view.
Figure 7:
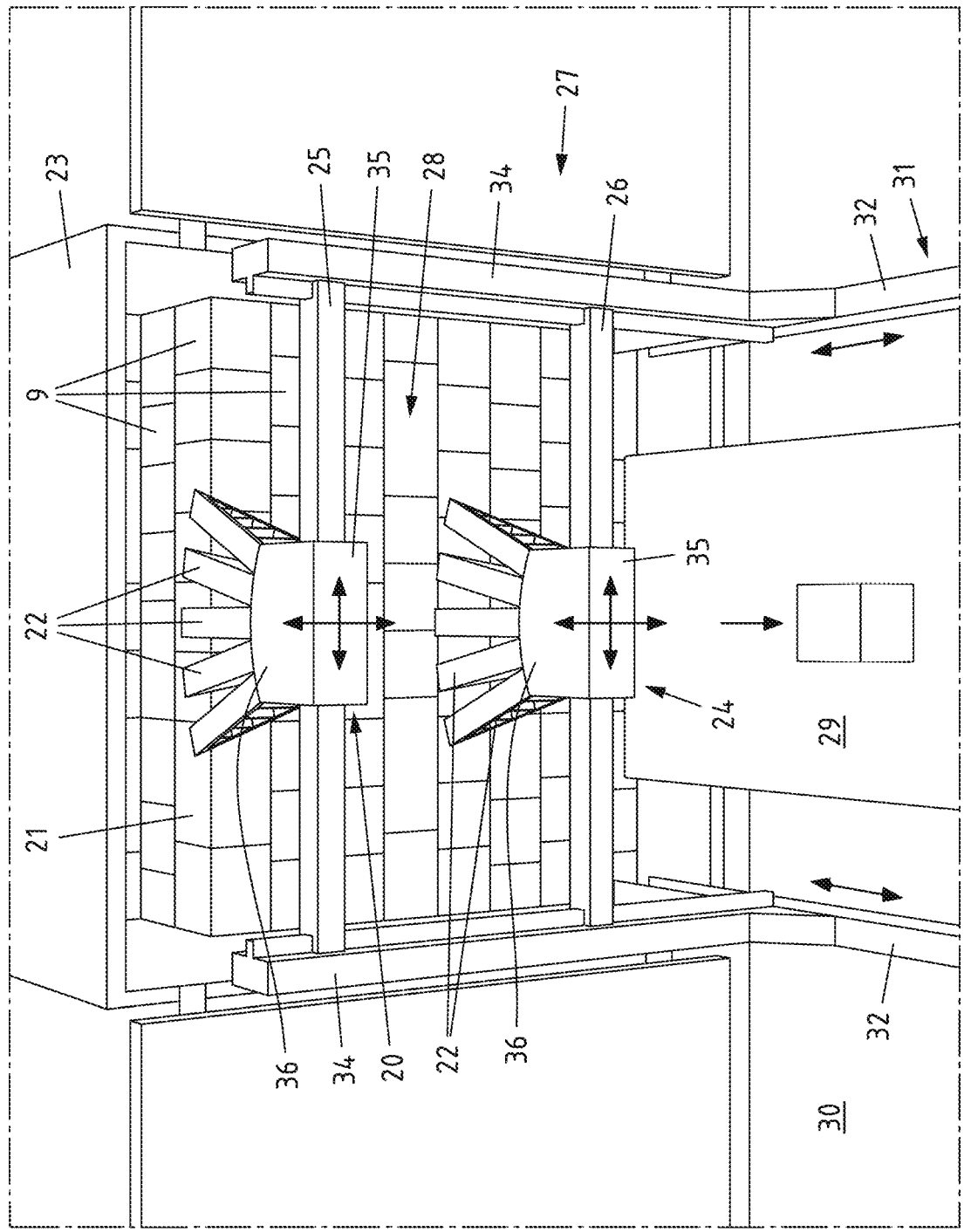
FIG. 7 shows the method and the device from FIG. 6 in a view from behind.

FIGS. 6 and 7 illustrate, schematically, the unloading of a container 23 in the form of an interchangeable container having stacked packages 9 by means of a device comprising an upper hand element 20 and a lower hand element 24. The upper hand element 20 is provided on an upper rail 25, while the lower hand element 24 is provided on a lower rail 26. The upper hand element 20 is held on the upper rail 25 such that it is displaceable along the upper rail 25 by a drive, not specifically illustrated, while the lower hand element 24 is adjustable along the lower rail 26 by a drive not specifically illustrated. Suitable drives here are, for example, linear drives, spindle drives and cable drives. The upper rail 25 and the lower rail 26 are both parts of a rail device 27, wherein the upper rail 25 and the lower rail 26 are provided vertically adjustably in the rail device 27. The upper rail 25 and the lower rail 26 can if necessary be adjusted vertically independently of each other or at a fixed distance from each other. Alternatively or additionally, the upper hand element 20 and the lower hand element 24 can if necessary be adjusted independently of each other or at a fixed distance from each other along the upper rail 25 and the lower rail 26. The rail device 27 is constructed in such a way that the rail device 27 can be moved up to the front face 28 of the stack 21 of packages 9.

This is done in such a way that the upper hand element 20 can grip the upper package 9 at the front face 28 of the stack 21 and remove it from the stack 21. Depending on the respective size of the packages 9, the upper hand element 20 can remove one package 9 after another or even at least to some extent in each case multiple packages 9 at once from the stack 21 of packages 9. In order to be able to remove the upper row of packages 9 from the stack 21 of packages 9 one after another from the stack 21, the upper hand element 20 is displaced continuously or step by step along the upper rail 25 and therefore along the front face 28 of the stack 21 of packages 9. The upper hand element 25 detects and grips the packages 9 with the finger elements 22, as has already been described in principle in connection with FIGS. 1 to 5. The plurality of finger elements 22, which in the present case, for example, involves five finger elements 22, permit packages 9 of very different dimensions and very different weights to be gripped in an efficient and simultaneously reliable way.

Figure 8:
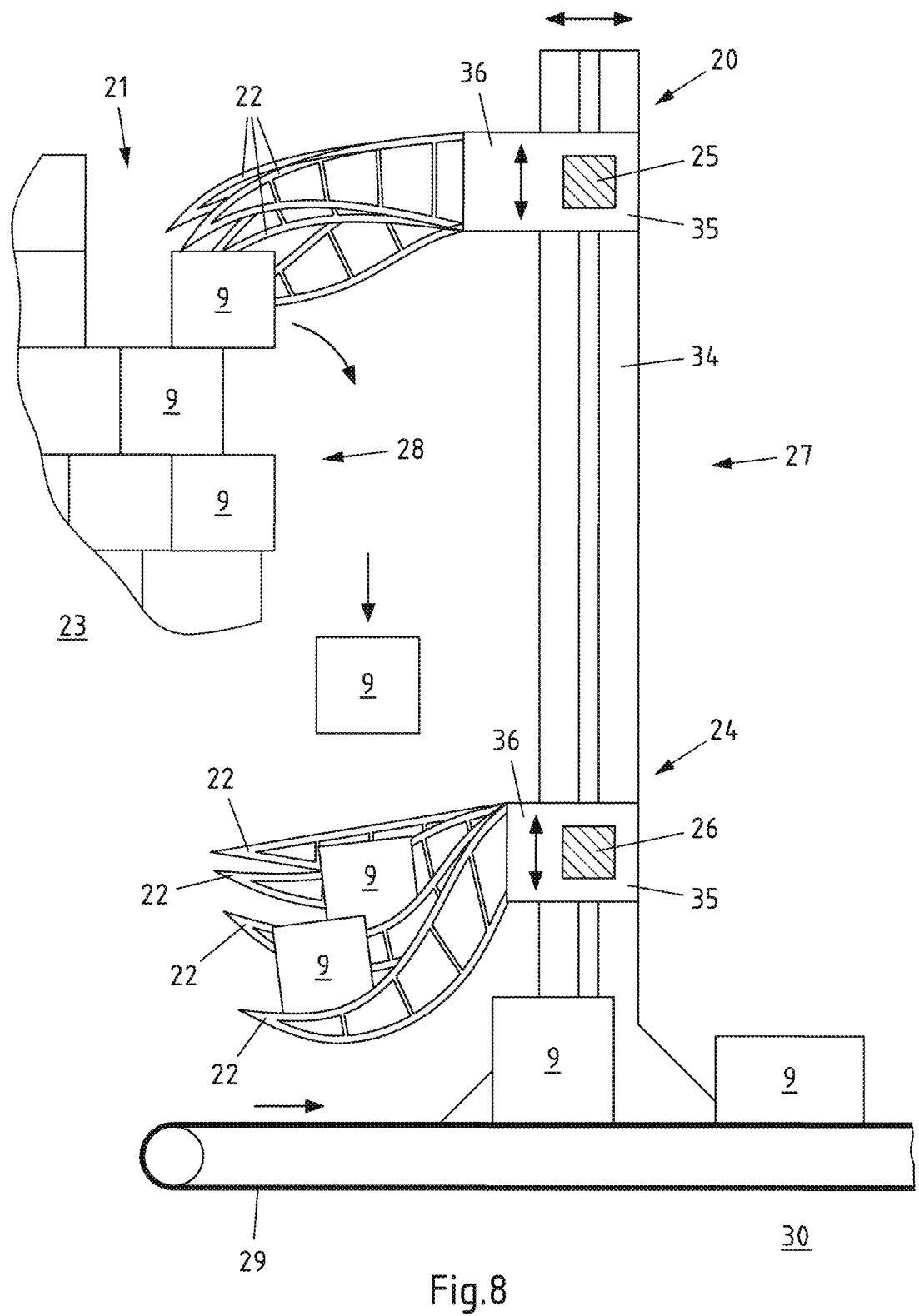
FIG. 8 shows a detail of the method and the device from FIG. 6 in a side view.

When the packages 9 at the front face 28 of the stack 21 have been gripped by the upper hand element 20 and removed from the stack 21, as illustrated in FIG. 8, the packages 9 fall into the lower hand element 24, by which the packages 9 are at least partly caught and accordingly braked. By means of a movement of the finger elements 22 toward each other, the packages 9 can also be separated by the lower hand element 24 if the packages 9 have been removed jointly from the stack 21 by the upper hand element 24 or at least caught jointly by the lower hand element 24. The lower hand element 24 is always arranged underneath the upper hand element 20 and the lower hand element 24 passes on the packages 9 to a belt conveyor device 29 arranged underneath the lower hand element 24. The packages 9 wholly located at the bottom in the container 23 can be gripped as necessary by the lower hand element 24, by the upper hand element 20 or by a further device and laid on the belt conveyor device 29, specifically if necessary while bypassing the lower hand element 24. During the unloading of the container 23, the rail device 27 is readjusted step by step and in this way in each case brought close to the front face 28 of the stack 21 of packages 9.

For this purpose, in the exemplary embodiment illustrated, a rail system 31 is provided on the appropriate ramp 30, which rail system 31 comprises two rails 32 fixed to the ramp 30 and two rails 33 fixed thereto and displaceable into the container 23 or the interchangeable container. The two rail pairs 32, 33 are at least substantially spaced apart as far from each other as the loading compartment of the container 23 is wide. The rail pairs 32, 33 each carry a vertical support 34, between which the upper rail 25 and the lower rail 26 for carrying the hand elements 20, 24 are provided in the manner of a crossmember. In the exemplary embodiment that is illustrated and to this extent preferred, the hand elements 20, 24 are mounted on sleeves 35, which embrace the rails 25, 26 and can be adjusted along the rails 25, 26. The finger elements 22 of the hand elements 20, 24 in the exemplary embodiment that is illustrated and to this extent preferred can be arranged in such a way that the finger elements 22 are provided so as to spread slightly laterally from a hand surface area 36 or at least substantially parallel to one another.

Not illustrated in detail, each hand element 20, 24, in particular the finger elements 22, is assigned a pressure sensor, preferably one each. For simplicity, the pressure sensors serve as measuring principles known per se and detect the pressure which is respectively exerted on the corresponding finger element 22, in particular on a flank element 2, 3 of the finger element 22. The signals correlated with the pressure can then be supplied to a controller 37, which then, as a function of the pressure, ensures a suitable movement of the corresponding hand element 20, 24 or the at least one finger element 22. Furthermore, in the exemplary embodiment that is illustrated and to this extent preferred, a sensor 38 is provided, which can be formed as an optical sensor and which at least partly detects the position of the stack 21 of packages 9, the contour of the stack 21 of packages 9 and/or the contour of the front face 28 of the stack 21 of packages 9. The sensor 38 then preferably forwards a signal correlated with the at least one contour and/or the at least one position to the controller 37. The controller 37 then controls the movement and the adjustment of the hand elements 20, 24 and the finger elements 22 such that the corresponding stack 21 of packages 9 is unloaded as efficiently and effectively as possible, specifically depending on the position of the stack 21 of packages 9, the contour of the stack 21 of packages 9 and/or the contour of the front face 28 of the stack 21 of packages 9.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

LIST OF DESIGNATIONS

1 Finger element
2,3 Flank element
4,5 End of finger element
6 Web
7,8 End of web
9 Package
10 End
11 Belt conveyor device
12 Supporting structure
13 Conveyor belt
15 Deflection roller
16 Deflection roller
17 Deflection roller
18 Drive
19 Drive roller
20 Upper hand element
21 Stack
22 Finger element
23 Container
24 Lower hand element
25 Upper rail
26 Lower rail
27 Rail device
28 Front face
29 Belt conveyor device
30 Ramp
31 Rail system
32 Rails
33 Rails
34 Support
35 Sleeve
36 Hand surface area
37 Controller
38 Sensor
α,β Angle
E Plane

The invention claimed is:

1. Method for unloading a container having packages with a rail device comprising at least one rail, wherein a hand element displaceable in the longitudinal direction of the rail is provided on the at least one rail, wherein the hand element has a plurality of finger elements, wherein the finger elements each have at least two flexible flank elements extending jointly from one end of the finger element to the opposite end of the finger element, wherein in each case the at least two flexible flank elements of the finger elements are each connected flexibly to each other via a plurality of webs, so that the finger elements can each be adjusted from at least a curved position into at least an extended position and back, wherein the packages are stacked in the container, wherein the stacked packages form a front face,
in which the rail device is brought close to the front face of the stacked packages,
in which the at least one hand element grips at least one package from the stack of packages and removes it from the stack of packages,
in which, following the removal of the at least one package from the stack of packages, the at least one hand element is displaced along the at least one rail, and
in which, following the displacement along the at least one rail element, the at least one hand element grips at least one further package from the stack of packages and removes it from the stack of packages.

2. Method according to claim 1,
in which the at least one hand element is pressed against the stack of packages in a gripping direction such that at least one flank element of at least one finger element is partially pressed in, and the at least one finger element is adjusted from an extended position into a curved position.

3. Method according to claim 1,
in which the at least one hand element and/or at least one finger element is adjusted via a drive unit for adjusting the at least two flank elements relative to one another in a longitudinal direction of the finger element from a curved into an extended position and/or back.

4. Method according to claim 1,
in which the at least one hand element and/or at least one finger element is used with at least one pressure sensor.

5. Method according to claim 4,
in which the at least one pressure sensor detects the pressure on the at least one hand element and/or on at least one finger element.

6. Method according to claim 1,
in which the packages removed from the stack of packages are moved directly or at least indirectly onto a belt conveyor device.

7. Method according to claim 6,
in which the packages removed from the stack of packages are moved downward onto the belt conveyor device arranged underneath the at least one hand element.

8. Method according to claim 1,
in which the position of the stack of packages, the contour of the stack of packages and/or the contour of the front face of the stack of packages is at least partly detected by a sensor.

9. Method according to claim 8,
in which the movement of the hand element is at least partly controlled depending on the position and/or contour of the stack detected by the sensor.

10. Method according to claim 1,
in which the at least one hand element and/or the at least one rail is adjusted upward or downward, depending on the height of the stack of packages, on the position of the stack of packages, on the contour of the stack of packages and/or on the contour of the front face of the stack of packages.

11. Method according to claim 1,
in which the at least one hand element is displaced along the at least one rail depending on the position of the stack of packages, on the contour of the stack of packages and/or on the contour of the front face of the stack of packages.

12. Method according to claim 1,
in which the at least one hand element removes at least one package from the stack of packages one after another and moves the removed package into at least one further hand element arranged underneath the at least one hand element.

13. Method according to claim 12,
in which the packages picked up one after another by the at least one hand element are forwarded one after another individually by a movement of the finger elements of the at least one further hand element relative to one another.

14. Method according to claim 12,
in which the at least one further hand element is adjusted to the side and/or vertically, depending on the position of the at least one other hand element.

15. Method according to claim 14,
in which the at least one further hand element is adjusted together with the at least one other hand element.

16. Method according to claim 12,
in which the at least one further hand element is displaced on the at least one rail or on at least one further rail in the longitudinal direction of the respective rail and/or is adjusted upward or downward.

17. Method according to claim 16,
in which the at least one further rail is adjusted upward and/or downward.

18. Method according to claim 12,
in which the at least one further hand element and/or the at least one further rail is adjusted vertically, depending on the height of the stack of packages, on the position of the stack of packages, on the contour of the stack of packages, on the contour of the front face of the stack of packages and/or on the position of the at least one upper hand element.

19. Method according to claim 12,
in which the at least one further hand element is displaced along the at least one rail, depending on the position of the stack of packages, on the contour of the stack of packages, on the contour of the front face of the stack of packages and/or on the position of the at least one upper hand element.

20. Method according to claim 12,
in which the at least one further hand element is adjusted to the side and/or vertically, depending on the position of the at least one other hand element, and
in which the at least one further hand element is adjusted together with the at least one other hand element while maintaining an at least substantially constant distance from each other.

21. Method according to claim 12,
in which the at least one further hand element is displaced along the at least one further rail, depending on the position of the stack of packages, on the contour of the stack of packages, on the contour of the front face of the stack of packages and/or on the position of the at least one upper hand element.

22. Method according to claim 12,
in which the at least one further hand element at least partly catches the respective at least one package and leads it onward in an at least partly braked manner.

23. Method according to claim 1,
in which the at least one rail device, and/or the at least one rail is moved into the container.

24. Device for unloading a container having packages according to a method of claim 1, with a rail device comprising at least one rail, wherein a hand element displaceable in the longitudinal direction of the rail is provided on the at least one rail, wherein the hand element has a plurality of finger elements, wherein the finger elements each have at least two flexible flank elements extending jointly from one end of the finger element to the opposite end of the finger element, wherein in each case the at least two flexible flank elements of the finger elements are each connected flexibly to each other via a plurality of webs, so that the finger elements can each be adjusted from at least a curved position into at least an extended position and back.

25. Device according to claim 24,
in which the container having packages is one of a box body, an interchangeable container, or a roller container.

26. Method according to claim 1,
in which the packages removed from the stack of packages are moved directly or at least indirectly onto a telescopic belt conveyor device.

27. Method according to claim 1,
in which the position of the stack of packages, the contour of the stack of packages and/or the contour of the front face of the stack of packages is at least partly detected by an optical sensor.

28. Method according to claim 1,
in which the position of the stack of packages, the contour of the stack of packages and/or the contour of the front face of the stack of packages is at least partly detected by a camera.

29. Method according to claim 1,
in which the at least one rail device includes at least one further rail, and
in which the at least one rail device, the at least one rail and/or the at least one further rail is moved into the container.

30. Method according to claim 1,
in which the at least one rail device and/or the at least one rail is moved into the container step by step.

31. Method according to claim 1,
in which the container having packages is one of a box body, an interchangeable container, or a roller container.

32. Method according to claim 1,
in which the at least one hand element and/or at least one finger element is used with at least one pressure sensor on at least one flank element, and
in which the at least one pressure sensor detects the pressure on the at least one hand element, on at least one finger element, and/or on at least one flank element of at least one finger element.

* * * * *